United States Patent
Wyatt

(10) Patent No.: US 12,206,244 B2
(45) Date of Patent: *Jan. 21, 2025

(54) METHOD AND APPARATUS TO FORM A VIRTUAL POWER GENERATION COLLECTIVE FROM A DISTRIBUTED NETWORK OF LOCAL GENERATION FACILITIES

(71) Applicant: Virtual Electric Inc., San Jose, CA (US)

(72) Inventor: David Wyatt, Austin, TX (US)

(73) Assignee: Virtual Electric Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,031

(22) Filed: Sep. 30, 2023

(65) Prior Publication Data
US 2024/0030706 A1    Jan. 25, 2024

Related U.S. Application Data

(63) Continuation of application No. 17/189,165, filed on Mar. 1, 2021, now Pat. No. 11,817,705, which is a
(Continued)

(51) Int. Cl.
*H02J 3/00*    (2006.01)
*G06Q 30/04*    (2012.01)
(Continued)

(52) U.S. Cl.
CPC .............. *H02J 3/008* (2013.01); *G06Q 30/04* (2013.01); *G06Q 50/06* (2013.01); *G01D 4/002* (2013.01);
(Continued)

(58) Field of Classification Search
CPC ...................................................... H02J 3/008
(Continued)

(56) References Cited

U.S. PATENT DOCUMENTS

2002/0143438 A1    10/2002    Akiyama et al.
2005/0222855 A1    10/2005    Brunson
(Continued)

FOREIGN PATENT DOCUMENTS

CN    1977436    6/2007
CN    201378753    1/2010
(Continued)

*Primary Examiner* — Daniel Kessie
*Assistant Examiner* — Dru M Parries

(57) ABSTRACT

A method of accounting for electrical power contribution and consumption is presented. The method comprises receiving information, from a plurality of facilities, wherein the plurality of facilities is operable to generate and/or consume electricity, and wherein the data comprises information concerning electricity contributions to a power grid, and/or consumptions from the grid by the plurality of facilities. The method further comprises applying a robust system of cryptographic processes to said information concerning electricity contributions, and attest to the authenticity of the information, as well as to the correct attribution of the facility claimed. Finally, the method comprises tracking and accounting electricity contributions and/or consumptions from each of the plurality of facilities using decrypted and verified information in a manner that allows contributions to be independently verified through audits. The method can also comprise compensating each of the facilities based on the respective electricity contribution and/or consumption of each facility.

20 Claims, 11 Drawing Sheets

Related U.S. Application Data continuation of application No. 13/841,098, filed on Mar. 15, 2013, now Pat. No. 10,938,207.

(60) Provisional application No. 61/624,190, filed on Apr. 13, 2012.

(51) Int. Cl.
*G06Q 50/06* (2012.01)
*G01D 4/00* (2006.01)

(52) U.S. Cl.
CPC ............... *Y02B 10/30* (2013.01); *Y02B 90/20* (2013.01); *Y04S 20/30* (2013.01); *Y04S 50/12* (2013.01)

(58) Field of Classification Search
USPC ............................................................ 307/18
See application file for complete search history.

(56) References Cited

U.S. PATENT DOCUMENTS

| | | |
|---|---|---|
| 2010/0057480 A1 | 3/2010 | Arfin et al. |
| 2010/0057582 A1 | 3/2010 | Arfin et al. |
| 2010/0191489 A1 | 7/2010 | Zolot |
| 2010/0293045 A1 | 11/2010 | Burns et al. |
| 2012/0053739 A1 | 3/2012 | Brian et al. |
| 2012/0095813 A1 | 4/2012 | Case |
| 2013/0039192 A1 | 2/2013 | Kubota et al. |
| 2013/0063125 A1 | 3/2013 | Chamarti et al. |

FOREIGN PATENT DOCUMENTS

| | | |
|---|---|---|
| CN | 201417394 | 3/2010 |
| CN | 101803138 | 8/2010 |
| CN | 102104250 | 6/2011 |
| CN | 102378432 | 3/2012 |
| WO | 03007120 | 1/2003 |
| WO | 2006059195 | 6/2006 |

METHOD AND APPARATUS TO FORM A VIRTUAL POWER GENERATION COLLECTIVE FROM A DISTRIBUTED NETWORK OF LOCAL GENERATION FACILITIES

CROSS-REFERENCE TO RELATED APPLICATIONS

This application is a Continuation of and claims priority to U.S. patent application Ser. No. 17/189,165, filed on Mar. 1, 2021, which is a Continuation of and claims priority to U.S. patent application Ser. No. 13/841,098, filed on Mar. 15, 2013 and now issued as U.S. Pat. No. 10,938,207, which claims the benefit of and priority to U.S. Provisional Application No. 61/624,190, filed on Apr. 13, 2012, each of which are hereby incorporated by reference in their entirety.

FIELD OF THE INVENTION

Embodiments according to the present invention generally relate to systems involving power generation and distribution and more specifically to methods for measuring and accounting for generated and distributed power.

BACKGROUND OF THE INVENTION

Historically, electrical power has been delivered from a power generation facility, for example, Northern California Power Agency ("NCPA"), to an end-consumer at a home or business facility through an electricity distributor, for example, Pacific, Gas and Electricity Company ("PG&E"). The power can usually be provisioned from any kind of power generation facility, for example, a hydroelectric, coal or steam plant. The electricity distributor, on the other hand, owns the grid of wires and sub-stations that distribute power to the consumers and is typically unrelated to the power provisioning facility. The end-consumer, traditionally, has not had any means to produce power locally at his or her home or business facility. The local home or business facility, therefore, has only needed to be equipped with electricity meters capable of measuring electricity drawn from the grid for supplying the power demands of the facility.

FIG. 1 illustrates a historical power generation and distribution system. Power is generated by a power generator 150 and then delivered to electricity consumers 160 through a power distributor or grid provider 155.

This historical model has presently evolved into one where the end consumers have the capability of generating their own power, for example, through the advent of home solar electric panels, blume gas generators, fuel cells, and wind turbines. Therefore, the traditional electricity meters have needed to be adapted to also account for how much power is being supplied back into the grid. This is accomplished, for example, by allowing the meters to "run backwards," whereupon the grid provider would provide a refund for the amount of kilowatt-hours ("kwh") supplied back into the grid. However, under the present model, the electricity provider is still in charge of accounting for contributions and determining the compensation scale for the contribution.

FIG. 2 illustrates a conventional power generation and distribution system as it exists presently. Power is generated by a power generator 250 and distributed to the consumers through an electricity distributor 255 similar to historical systems. However, in the conventional power generation and distribution systems of today, certain consumers 275 have means of generating electricity at their own facility through the use of, for example, solar panels.

The problem with the present model of power distribution and accounting is that consumer power generation capabilities are in effect competing with corporate generation, and the corporations, in particular, the grid providers, may choose to reward contributions back into the grid at a much reduced rate, substantially lower than the price the electricity supplier would charge consumers drawing from the grid. This is problematic especially because while the purchase and installation cost of the solar electric panels is less per kwh over the life of the solar panels than the cost of the electricity drawn from the grid, it is typically more expensive than the amount refunded by the electricity distributor corporations for supplying power back into the grid.

These constraints have, in effect, placed an economic limit on the practical size of a home or business solar panel installation for a typical consumer. In short, if the installation produces more electricity than the typical electrical demand of the home on which it is fitted, it simply cannot recoup the cost of the installation through the money refunded through oversupply going back into the grid. Unfortunately, this leads to an artificial constraint on the typical home generation installation, wherein the policy of the electricity distributor for the amount of money refunded rather than the installation area or other physical capability of the installation site is the key determinative factor governing the size of the clean solar home generation installation.

For example, a typical electricity supplier or distributor may charge $0.41 per kwh for a tier one electrical consumer at the peak demand time, while refunding surplus electricity contributed back into the grid at only $0.11 per kwh. Meanwhile, a typical solar installation may cost $0.22 per kwh over the life of the panel. Under this model, it makes little economic sense for a typical consumer to utilize a solar installation with excess capacity over what the consumer's home or business demands, because any oversupply contributed back into the grid will not be compensated at the same rate as the power consumed. Similarly, a factory employing wind turbines would face a similar dilemma if the size of the turbine results in excess capacity over what the local facility demands.

Since the electricity generated by solar panel, wind turbine, or a coal fired generating facility is the same once it is on the grid, there is no reason why one form of power generation should earn less per kwh than any other method, whether it is solar, wind, geothermal or other. However, the problem with sources of electricity being fungible is that it is challenging to distinguish electricity contributed by one provider from another. Therefore, it is problematic to account for the contributions from the various different types of electricity providers.

BRIEF SUMMARY OF THE INVENTION

Accordingly, a need exists for a system wherein the electrical contribution of any generation facility can be accounted for fairly and securely. Also, what is needed is a robust method of accounting for electricity contribution at the source of the power supply into the grid. Using the beneficial aspects of the systems described, without their respective limitations, embodiments of the present invention provide a novel solution to address these problems.

Disclosed herein is a method whereby each facility's power contribution can be recorded, tallied and timestamped by one or more independent auditing bodies allowing the formation of virtual electricity suppliers.

In one embodiment, a method of accounting for electrical power contributions is presented. The method comprises receiving encrypted data from a plurality of facilities, wherein the plurality of facilities is operable to generate electricity, and wherein the encrypted data comprises information concerning electricity contributions to a power grid by the plurality of facilities. The method further comprises decrypting the encrypted data to access information concerning electricity contributions. Finally, the method comprises tracking electricity contributions from each of the plurality of facilities using decrypted data. The method can also comprise compensating each of the plurality of facilities based on the respective electricity contribution of each facility.

Embodiments include the above and further comprise determining compensation for each of the first plurality of facilities based on the respective electricity contribution of each facility.

Embodiments include the above and wherein the encrypted data is encrypted using a public key cryptographic system.

Embodiments include the above and wherein the public key cryptographic system is selected from a group comprising: public key distribution system, digital signature system and public key cryptosystem.

Embodiments include the above and wherein the public key cryptographic system uses an RSA algorithm.

Embodiments include the above and wherein the first plurality of facilities is further operable to consume electricity, and further wherein the encrypted data comprises information concerning electricity consumption from a power grid by the first plurality of facilities.

Embodiments include the above and further comprising accounting for electricity consumption by each of the first plurality of facilities using the decrypted data.

Embodiments include the above and further comprising: (a) receiving data from a second plurality of facilities, wherein the second plurality of facilities is operable to consume electricity, and wherein the data comprises information concerning electricity consumption from the power grid by the second plurality of facilities; and (b) accounting for respective electricity consumption for each of the second plurality of facilities using received data.

Embodiments include the above and further comprising determining a compensation amount for a grid provider for a portion of electricity consumed by the first plurality of facilities and the second plurality of facilities, wherein the portion of electricity is contributed by the grid provider, and wherein determinations for a compensation amount to the grid provider are based on information concerning electricity consumption received from the first plurality of facilities and the second plurality of facilities.

Embodiments include the above and wherein the first plurality of facilities and the second plurality of facilities form a virtual power generation network.

Embodiments include the above and further comprising selling surplus electricity produced by the first plurality of facilities to consumers within the virtual power generation network.

Embodiments include the above and wherein the encrypted data comprises data packets, wherein the data packets comprise: (a) power contribution measured as an integral of power over time; (b) a timestamp comprising the time of day at which the power contribution is recorded; and (c) a period of time over which the power contribution is measured.

Embodiments include the above and wherein the encrypted data is received from the first plurality of facilities by querying a monitoring station located at each of the first plurality of facilities.

In one embodiment, an apparatus for measuring power is presented. The apparatus comprises a meter coupled to a power generation plant at a local facility, wherein the meter comprises: (a) a current sense module operatively coupled to a processor, wherein the processor in conjunction with the current sense module is operable to compute power contributed by the power generation plant; (b) a memory operable to store computed power contribution, and a first set of encryption keys used to communicate securely with a grid provider; and (c) a network interface operable to communicate with the grid provider, wherein a communication between the meter and the grid provider is secured using the first set of encryption keys, and wherein the communication comprises relaying the computed power contributions to the grid provider.

In another embodiment, a system of accounting for electrical power contributions is presented. The system comprises an accounting server communicatively coupled to a plurality of facilities, wherein the plurality of facilities is operable to generate electricity. The accounting server comprises a memory operable to store accounting information concerning electrical contributions from the plurality of facilities and a tracking application. The server also comprises a network interface for communicating with the plurality of facilities and a processor coupled to the memory and the network interface. The processor is configured to operate in accordance with the tracking application to (a) receive encrypted data from the plurality of facilities, wherein the encrypted data comprises information concerning electricity contributions to a power grid by the plurality of facilities; (b) decrypt the encrypted data to access the information concerning electricity contributions; and (c) track electricity contributions from each of the first plurality of facilities using decrypted data.

BRIEF DESCRIPTION OF THE DRAWINGS

Embodiments of the present invention are illustrated by way of example, and not by way of limitation, in the figures of the accompanying drawings and in which like reference numerals refer to similar elements.

Figure 1:
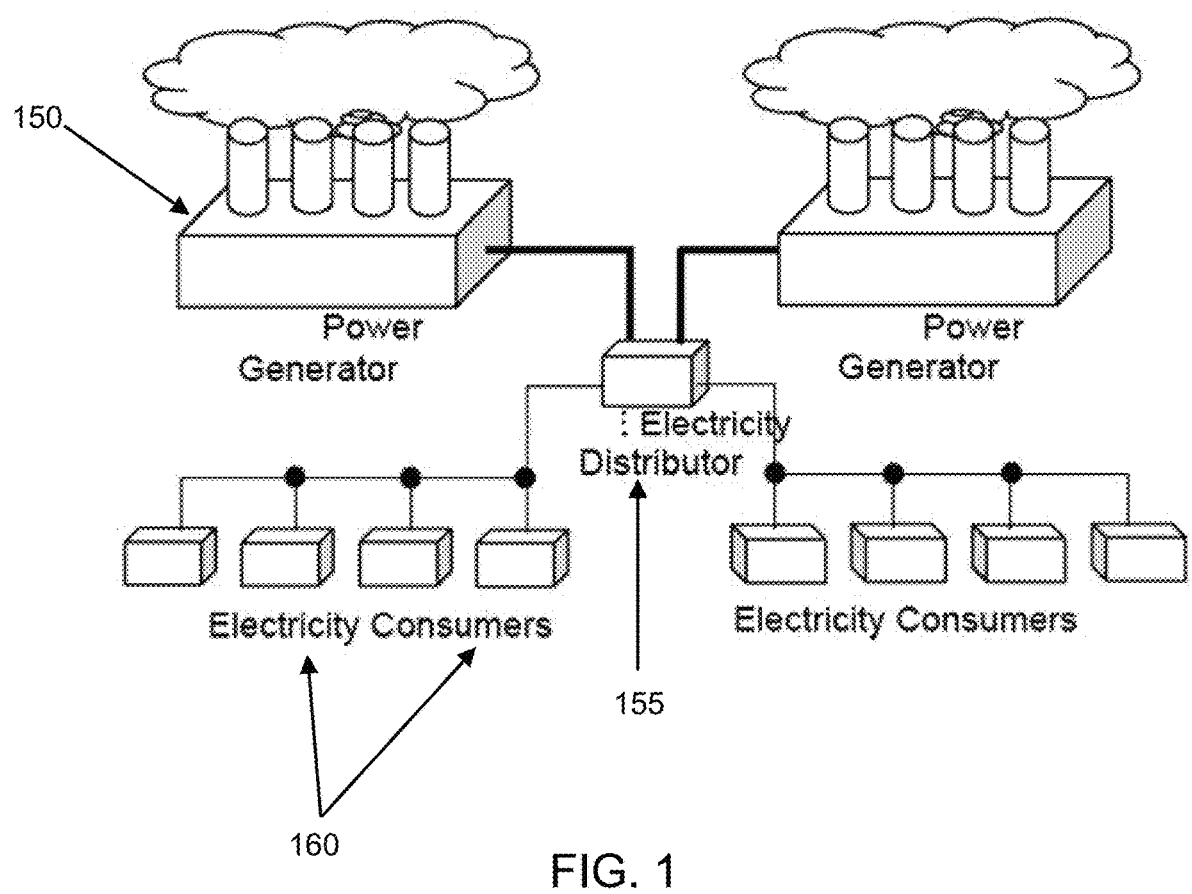
FIG. 1 illustrates a historical power generation and distribution system.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "accounting," "receiving," "tracking," "encrypting," "decrypting," "allocating," "associating," "accessing," "determining," "identifying," or the like, refer to actions and processes (e.g., flowchart 800 of FIG. 8) of a computer system or similar electronic computing device or processor (e.g., system 110 of FIG. 4). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Method and Apparatus to Form A Virtual Power Generation Collective from a Distributed Network of Local Generation Embodiments of the present invention relate generally to collecting measurements of power contribution and more specifically to a method and system of determining power generation capability in a distributed network of local generation facilities. Accordingly, embodiments of the present invention provide a system wherein the electrical contribution of any generation facility can be accounted for fairly and securely. Also, embodiments of the present invention provide a robust method of accounting for electricity contribution at the source of the power supply into the grid. With the fair and secure accounting of electricity contributions of the present invention, an open market can be realized wherein any producer of electricity can be fairly rewarded according to the size and efficiency of their contribution.

Figure 3:
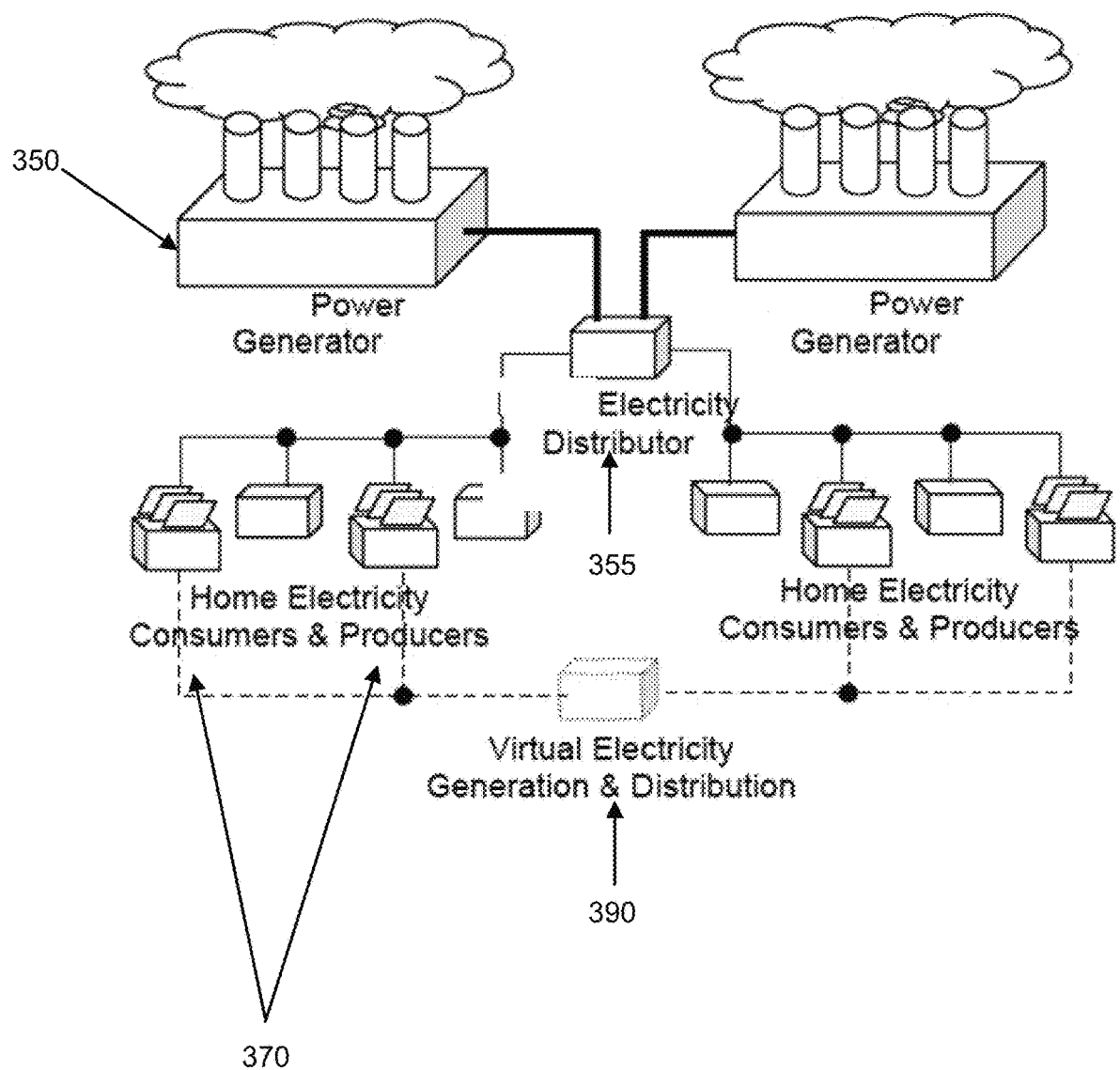
FIG. 3 illustrates an electricity generation and distribution system in accordance with one embodiment of the present invention.

FIG. 3 illustrates an electricity generation and distribution system in accordance with one embodiment of the present invention. Power is generated by a power generator 350 and distributed to the consumers through an electricity distributor 355 similar to conventional systems discussed above. However, for certain consumers 370 that have a means for generating electricity at their own facility, one embodiment of the present invention provides a virtual electricity and distribution hub 390 that aggregates and keeps track of the various power contributions from the home electricity producers 370.

Another embodiment of the present invention allows power generated by each local facility 370 to be recorded and robustly acknowledged so that each producer at the local facility 370 can verify that their contribution is recognized and further verify that they are being fairly compensated for their contribution.

One embodiment of the present invention allows for verification that the power generated by one or more local facilities 370 represents an actual contribution to the grid. This is important because it allows the local facilities 370 to recognize, verify and accept that the contribution made by other contributing facilities into the grid is not being falsified.

Another embodiment of the present invention keeps track of and accounts for the time at which the power contribution is made, thereby, providing support for flexible compensation for power generation. The compensation can be adjusted to more fairly compensate electricity provided from local generation facilities and from providers that generate electricity on demand or at times when wind, sun and other natural sources of electricity are less abundant. For example, entities that generate power at night, when solar panels at the local facilities are not running as efficiently, can be compensated at a higher rate to compensate their higher cost of power generation.

In one embodiment, once the contribution of one or more facilities to the grid can be robustly and accurately recognized, the facilities can form a conglomerate or a virtual power generation organization for the purpose of keeping track of and accounting for the contributions of conglomerate members and creating a single virtual organization. Such a virtual organization would have the advantage of presenting a single face to promote and charge consumers, and to facilitate the distribution of funds to producers according to contribution. For example, virtual electricity generation and distribution hub 390 in FIG. 3 can, in one embodiment, be a virtual power generation organization comprising a plurality of local power generation facilities that keeps track of the contributions from its various members and apportions funds accordingly. In one embodiment, the virtual power generation organization could be set up to allow any participating facility within the organization to purchase electricity directly from another participating facility. For example, a facility could end up purchasing electricity directly from a neighboring facility under this arrangement.

Individual home electricity contributors can benefit from joining other home contributors in the formation of a virtual power generation collective. One advantage in forming a virtual power collective is that it would simplify the accounting and billing process. The virtual power generation organization may take a percentage of the total amount collected to cover their costs and overhead. Further, the compensation paid out by the virtual power collective may be applied more fairly by the contributors within the conglomerate towards the future development of new facilities or larger facilities for electricity production.

Further, compensating the individual contributors fairly would likely encourage continued investment in larger home generation facilities. Another advantage of the present invention is that by making installation of larger home generation facilities more economically attractive, demand for more generation capability and, in particular, more efficient generation capability is driven up. Accordingly, facilitating virtual power generation capability can create a new power generation economy by providing an organically created economic stimulus for purchasing of local electricity generation capabilities, for example, home solar panels. It can also drive an increased investment in technologies to improve the efficiency of small scale power generation capabilities, e.g., home fuel cells.

Additionally, the ability to recognize and distinguish the contributions from the various facilities, or conglomerate of facilities, into the grid can provide consumers the ability, in one embodiment, to choose to compensate whichever entity they prefer to pay for their supply of electricity. For example, a consumer may choose to pay a local virtual power generation organization formed from the combined contributions of multiple local home power generation facilities within the consumer's community.

One objective of the present invention is to connect suppliers and consumers via a virtual electric grid formed from networked micro-generation capable facilities. Connecting the suppliers and consumers allows small scale producers of solar, wind and geothermal energy to collaborate together to collect compensation or funding for facility maintenance and improvement. As an increasing number of local electricity generating facilities such as solar panels are being installed on a smaller scale, for example, in residential homes and corporate facilities, the ability of these facilities to contribute power back into the grid as well as support local demand for further installations continues to grow.

As the number of distributed local generation facilities grows, the opportunity arises for these facilities to collect and pool their contributions by forming a Virtual Power Generation Network ("VPGN"). A VPGN can be a collection of power generation facilities, which operate collectively to form a distributed power generation capability. When a VPGN is available on a grid as a power provider, other electricity consumers have an option to then purchase electricity from the VPGN. Since the VPGN is established via a robust data collection through accounting for each facility's contribution to the VPGN, it is then possible to account for the contribution of each local generation facility and to distribute funding according to amount of contribution and the time stamp on when the contribution was made. In essence, the power distribution and accounting system of the present invention allows all the contributions from the various facilities to be accounted for in a "cloud," whereby individual consumers can buy electricity for their personal use directly from the cloud.

In one embodiment, a facility power generation meter ("FPGM") is located at each facility, which counts the power either drawn from or supplied to the grid from the facility generation plant ("FGP"). The FGP is the power generation capability local to a particular facility, e.g., solar panels at the facility. Each FPGM is connected to a grid provider ("GP"), which is the owner of the neighborhood electrical connection to the facility.

Figure 4:
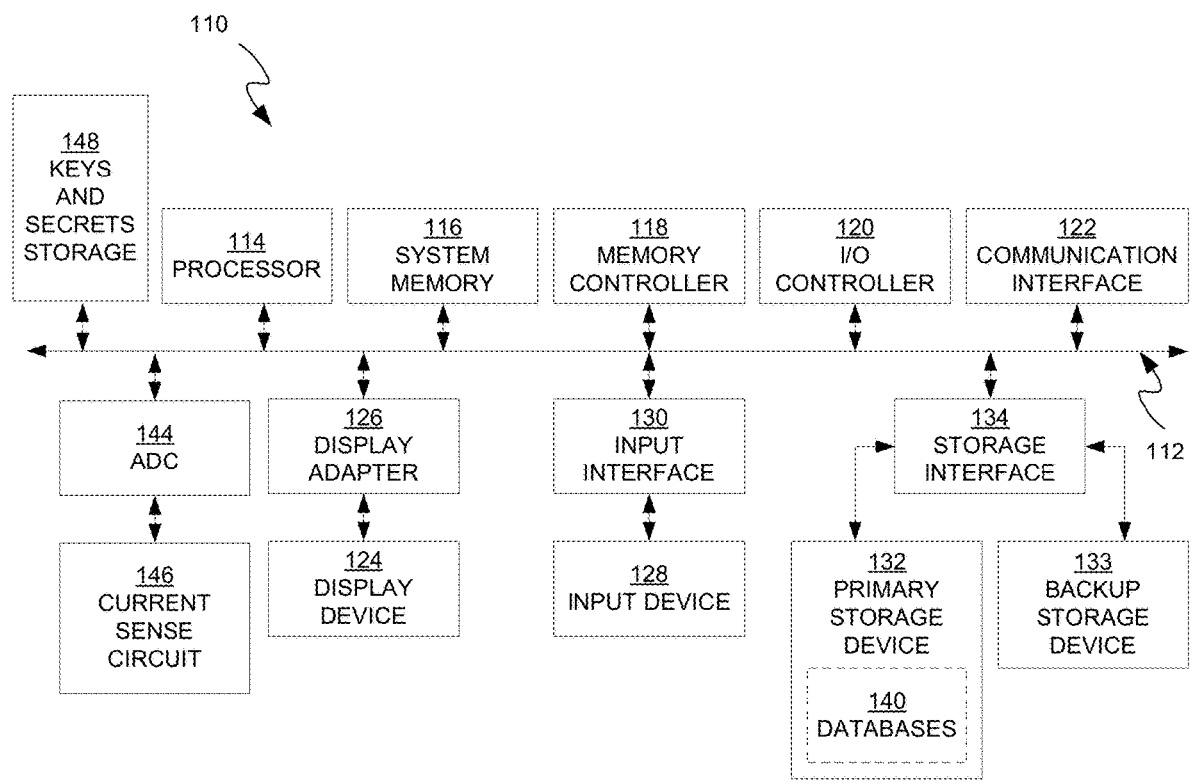
FIG. 4 is an exemplary computing system for a facility power generation meter ("FPGM") in accordance with embodiments of the present invention.

FIG. 4 illustrates an exemplary computing system 110 for a facility power generation meter ("FPGM") in accordance with embodiments of the present invention. Computing system 110 broadly represents any single or multi-processor computing device or system capable of executing computer-readable instructions. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 4, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Or, for example, communication interface 122 may facilitate communication between the FPGM and the grid provider. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device, for example, at the grid provider's end, or send instructions to a remote device for execution.

In one embodiment, the communication interface 122 on the FPGM can connect to the network through one of various protocols, e.g., wirelessly through a Wi-Fi connection, or through a wired Ethernet connection or even by communicating using Ethernet over power cables.

As illustrated in FIG. 4, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 4, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 4, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one embodiment, the FPGM can also include storage 148 to store encryption keys used to communicate with the grid provider or VPGNs. Storage 148 can be separate from or part of the primary storage device 132. Also, in one embodiment, all the storage employed in system 110 would either be secure or use code signing techniques to ensure secure storage and execution of programs and software on the FPGM.

Figure 2:
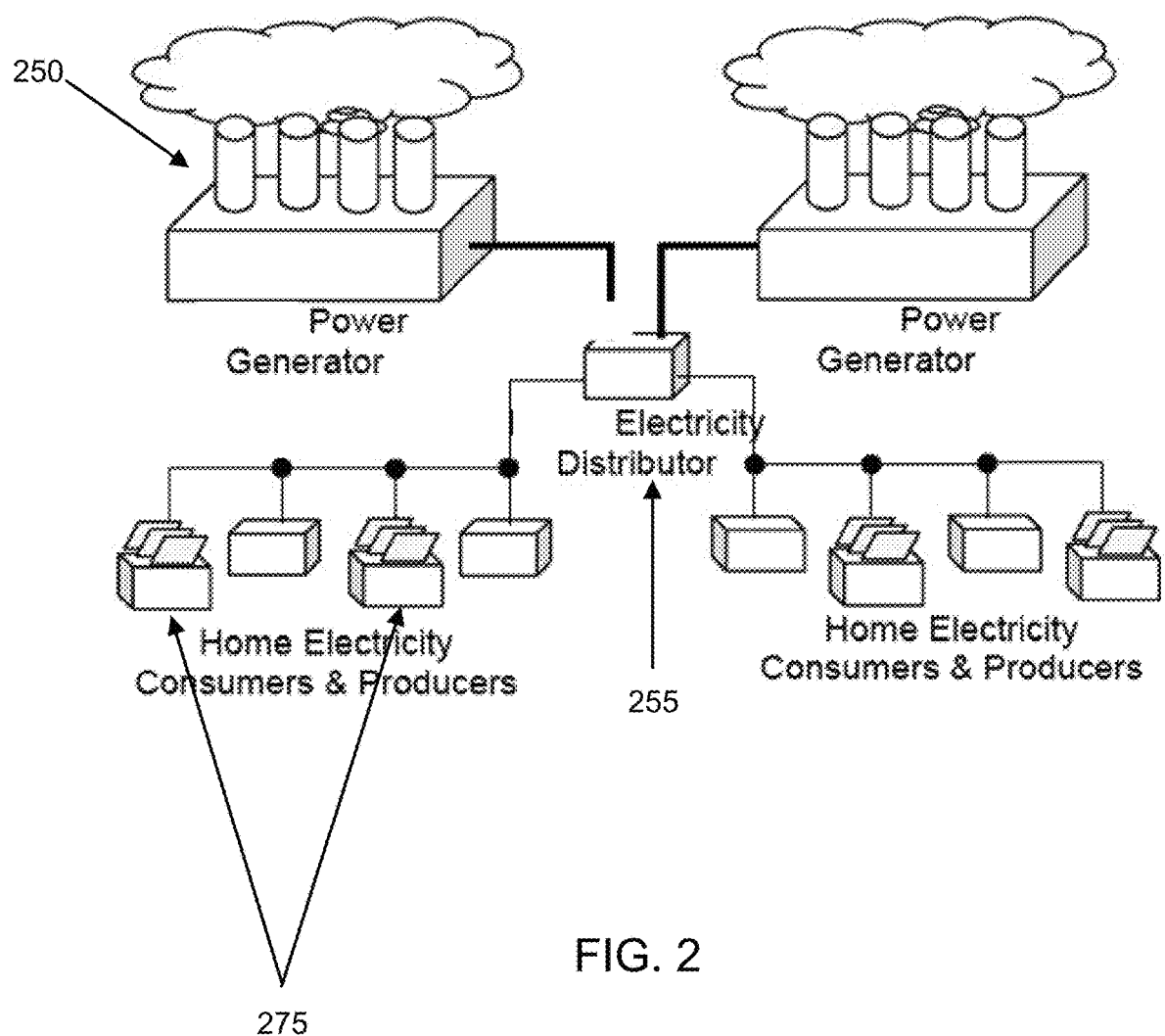
FIG. 2 illustrates a conventional power generation and distribution system as it exists presently.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 4, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

In one embodiment, the processor 114 is capable of processing data from power detection (or current sense) circuit 146 that is received subsequent to being processed through an analog to digital converter 144. The processor 114, in one embodiment, can also be programmed to compute a history of power production and consumption.

Many other devices or subsystems may be connected to computing system 110. Conversely, all of the components and devices illustrated in FIG. 4 need not be present to practice the embodiments described herein. The devices and subsystems referenced above may also be interconnected in different ways from that shown in FIG. 4. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 5:
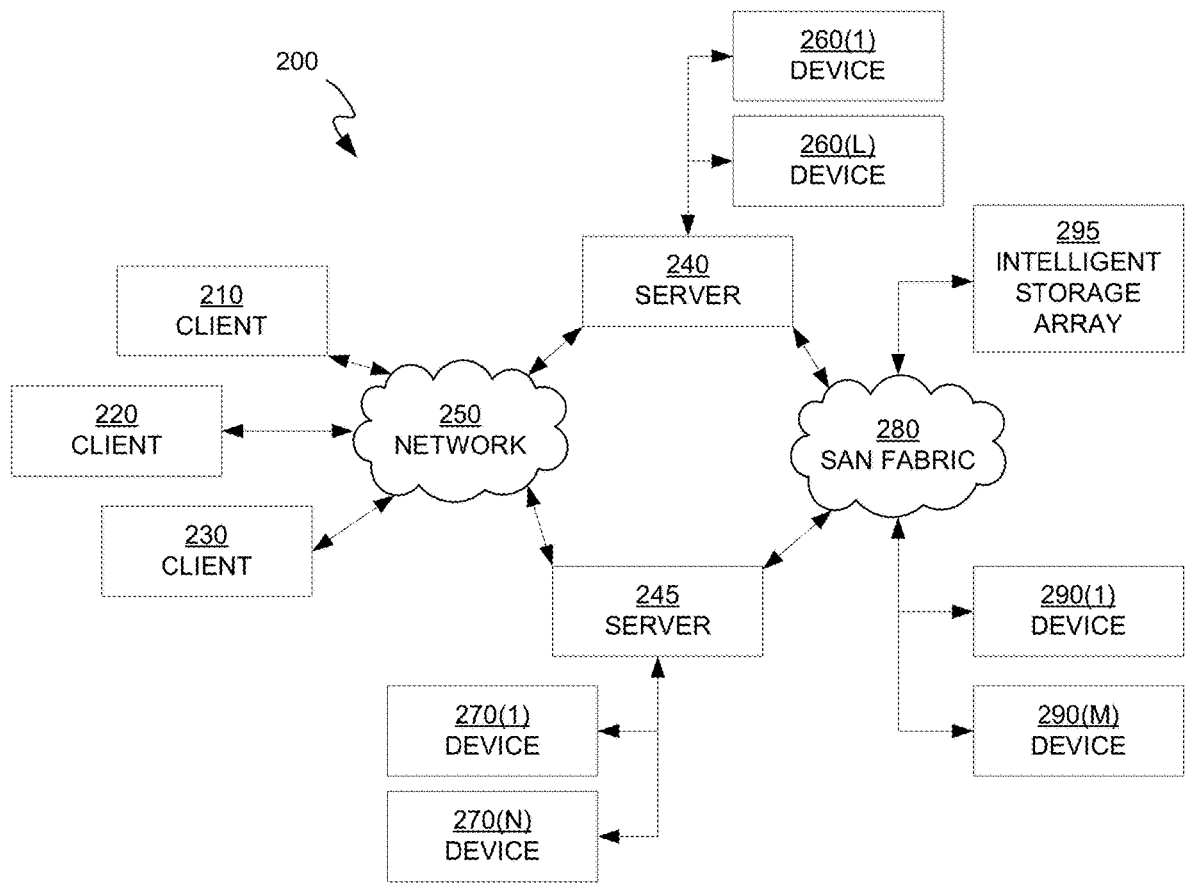
FIG. 5 is a block diagram of an example of a network architecture in which client FPGMs and servers may be coupled to a network, according to embodiments of the present invention.

FIG. 5 is a block diagram of an example of a network architecture in which client FPGMs 210, 220, and 230 and servers 240 and 245 may be coupled to a network 250, according to embodiments of the present invention. Servers 240 and 245 may, in one embodiment, belong to the VPGN, where they, among other things, keep track of the contributions made by the FGPs and communicated to the VPGN servers using the client FPGMs 210, 220 and 230. Servers 240 and 245 may also, in another embodiment, belong to the grid provider's network and be used to collect information about the contributions from the various FGPs. In a different embodiment, server 240 may belong to the VPGN while server 245 may belong to the grid provider's network. Client systems 210, 220, and 230 generally represent any type or form of computing device or system used on a FPGM, such as computing system 110 of FIG. 4.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

With reference to computing system 110 of FIG. 4, a communication interface, such as communication interface 122, may be used to provide connectivity between each client system 210, 220, and 230 and network 250. Client systems 210, 220, and 230 may be able to access information on server 240 or 245 using special purpose client software used to communicate with the FPGMs. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 5 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 6:
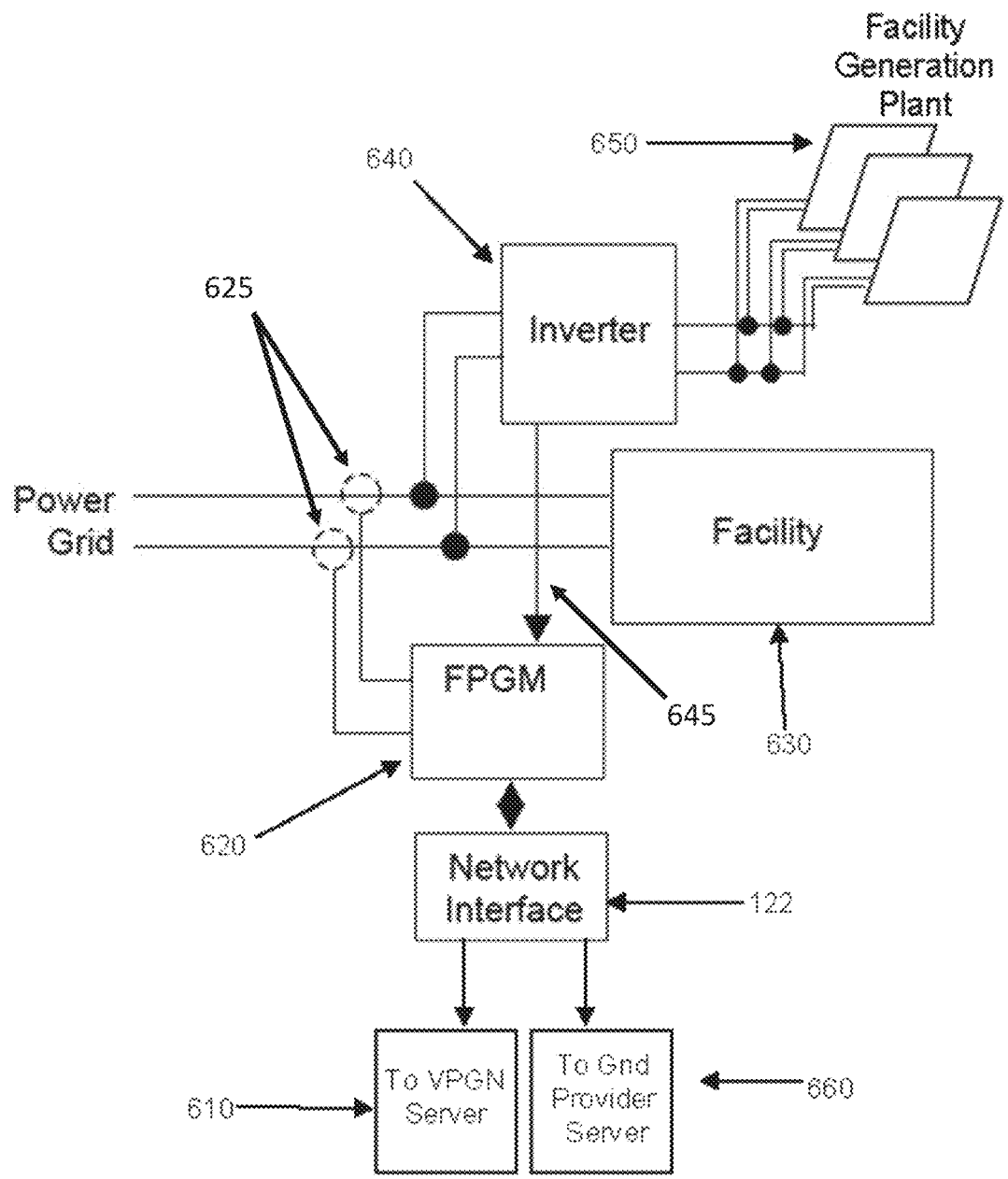
FIG. 6 is a block diagram illustrating a more detailed view of a virtual electricity distribution system at the source of the power supply in accordance with embodiments of the present invention.

FIG. 6 is a block diagram illustrating a more detailed view of a virtual electricity distribution system at the source of the power supply in accordance with embodiments of the present invention. A local facility 630 that is part of the VPGN may have a local facility generation plant ("FGP") as discussed above. For example, the FGP may comprise solar panels 650 as shown in FIG. 6. Where solar panels are being used to generate power, a solar inverter 640 may be part of the installation at the local facility. Inverter 640 converts the variable direct current (DC) output of a photovoltaic solar panel into a utility frequency alternating current that can be fed into a commercial electrical grid or used by the local off-grid electrical network. The FPGM 620 that is at the source of the power supply may be used to keep track of the electricity contribution and consumption of the respective facility 630 to which it is connected. A facility power meter (not shown) is a power meter at the facility 630 which counts the power consumed from the grid. FIG. 6 element 625 represents the current sense circuit (per FIG. 4 element 146), measuring net power flowing in/out: from grid power line to the local facility, and thus the facility's net power, that is: the net difference between facility-local generation and facility-local consumption. FIG. 6 element 645 represents the communication interface, from the inverter 640 to the FPGM 620, communicating information on the facility-local power generation.

A line of communication 645, between the inverter 640 and the FPGM 620, as shown in FIG. 6 communicates FGP power generation information from the inverter 640 to the FPGM 620. Additionally, in FIG. 6., element 625, power measurement sensors are illustrated by circles on the "Power Grid" lines, connected to the FPGM 620, monitoring the net power flowing to/from the facility. As is well understood, and obvious to anyone familiar with the basic principles of electricity (i.e., Kirchoff's Law, and Ohm's Law), the net observed power on the grid power line to the facility by element 625, will be the difference between the power generated by the facility, and the power consumed by the facility, and thus: "Net Contribution"="Generation"−"Consumption".

As a result of receiving the information of net power flowing in/out of the facility, and the inverter 640 communicating the FGP generation power to the FPGM 620, the FPGM 620 is thereby enabled to derive the consumption of the specific facility, as distinct from the net observed power (e.g., the power observed via element 625, the sensors on the "Power Grid" lines), and distinct from the power generation (e.g. the FGP power generation information communicated from the inverter 640, via FIG. 6., element 645). And further to distinguish whether the facility has a net positive contribution back to the power grid (i.e., greater generation), or a net negative contribution (i.e., greater consumption), the amount of facility contribution is based on the relative amounts of facility generation versus facility consumption.

The power grid sensors in FIG. 6., element 625, may for example, use inductive coupling, physical wire taps to measure power, or any other method for measuring power flow. The inverter communication interface in FIG. 6., element 645, may for example, use USB, CAN, RS-232, RS-485, Ethernet or other physical connection. Also, TCP/IP, Modbus, CANbus, or any other common protocol for reporting generation power may be used. The physical connections and protocols for inverter communication, as defined by IEEE 1547.1 and 1547.3 (circa 2007) industry inverter interface specification, and as mandated by UL 1741 (circa 2010), requirements for inverters. While described in conjunction with these embodiments, it will be understood that they are not intended to limit the disclosure to these embodiments.

In one embodiment, each FPGM 620 at each facility needs to have a secure means of communicating over the network, e.g., to a grid provider 660 or the VPGN 610. This can be done by ensuring that all data transmitted to and from a FPGM is encrypted. Encrypting the data ensures that there is integrity to the system and that each facility's contribution can be accounted for accurately. In one embodiment, public key cryptography using asymmetric key algorithms such as RSA can be used to encrypt the data. In another embodiment, any of the three primary kinds of public key cryptography systems can be used, namely, public key distribution systems, digital signatures system, and public key cryptosystems. The three kinds of public key systems can perform both public key distribution and digital signature services. For example, well known algorithms such as Diffie-Hellman key exchange, which is a type of public key distribution system, and Digital Signature Algorithm, which is a type of digital signature system, can be used. However, the invention is not limited to only using public key cryptographic algorithms. Any number of various methods and algorithms may be used to encrypt FPGM data.

Where public key cryptographic techniques are used, each FPGM at a subscriber's site may comprise a private key and a public key pair. This private and public key pair can be provided by, for example, the grid provider. The FPGM may report its power consumption or contribution to the grid provider server 660 using Energy Contribution Count data packets ("ECC") over network interface 122 as discussed above.

The ECC data packets can comprise the power contribution measured as an integral of power over time (watt-hours). It can also include a timestamp, including the time of day in which the contribution was recorded. Also, it can include a number identifying its order in the sequence of ECC packets transmitted. Further, it can include the unit of time over which the energy consumption or production was measured. It may include the amount of power, the direction of power flow, and the duration of flow. In addition, it can also include the integral of contribution over the time interval. It may include one or more historical integrals summing the contribution over longer intervals. It may include facility location or location within the facility, facility identifier, as well as the type of generation. It may include the method of power generation at the facility, such as whether wind, solar, thermal or other generation method. Finally, it may include recipient supplied information such as recipient and facility identifiers, recipient supplied cryptographic nonce. By including the integrals of contributions over certain time intervals, the ECCs protect against data being lost due to network outages or other potential transmission errors, because the integrals may used to reconstruct the contribution data.

In one embodiment where public key cryptography is used, the FPGM 620 can sign the ECC with a private key provided by the grid provider. It also can include a certificate signed by the grid provider (or other recognized signing authority), which includes a matching public key, thereby, allowing the ECC to be decrypted at the receiving end.

In one embodiment, the FPGM 620 may be programmed to include signatures of the prior ECCs in subsequent ECCs as a way to protect against tampering. Further, forensic data collection techniques can be used to examine the history of ECC packets to verify lost data packets. Also, the FPGMs can be programmed to continue including past ECC signatures in subsequent packets until receipt of transmission from the grid provider acknowledging receipt of the ECC. This mechanism allows the history of contribution and consumption for a particular FPGM to be recreated easily.

In one embodiment, the FPGM includes a mechanism to perform a handshake with the auditing server, e.g., the grid provider's server 240 or 245 in FIG. 5. For example, the auditing server can transmit certain verification information to be introduced into the signature in order to verify the data received from the FPGM. The verification information can comprise timestamps, recipient supplied nonce, sequential numbers, or other identification information that can be integrated into the signature by the FPGM to provide robustness for the information being transmitted.

In another embodiment, the FPGM may utilize one of many different techniques to transmit the energy count to the grid provider's network using the ECCs. For example, the FPGM can transmit data over the grid's wired network to the sub-station. Alternatively, the FPGM may transmit the ECCs over local facility wireless networks, e.g., through WiFi access points at the local facility. Or the FPGM may transmit the energy counts to the grid provider via wireless mesh networks formed from neighboring facilities with similar FPGMs.

The sub-station collects the ECC packets transmitted by the various FPGMs, verifies the signatures and accumulates the contributions of each FGP. It can also run audit checks. The auditing process can identify tampering or falsified contributions. It can also identify situations where an FGP's ECC data is missing, e.g., due to a local network failure.

In one embodiment, where data collection is not possible over the network, for example, because of a network outage or because of a facility's remote location, or where the data may need to be collected manually, for example, to detect tampering or falsification, a technician may visit a FGP at the local facility 630 and collect the data manually from a FPGM 620 using a handheld collection device. Holding the device in close proximity to the FPGM, the FPGM may transmit data to the handheld collection device using Infra-Red, Near Field wireless technologies, Bluetooth, Electromagnetic Induction, or other non-contact, and direct electrical interface contact data transmission mechanisms.

In one embodiment, as the handheld collection device downloads ECC data from the FPGM 620, the meter and device may confirm each time interval recorded. The FPGM may subsequently insert this download confirmation into subsequent ECC data signatures. The confirmation may comprise a serial number of the handheld collective device, the last timestamp collected and the time intervals collected.

As discussed above, in one embodiment, the ECC is signed with a timestamp, recording when a unit of power has been supplied into the grid. By including the unit of time over which an energy contribution was made, the ECC allows both power and time to be factored into the running integral, thereby, allowing a long term average to be computed. As acknowledgements of the ECCs are received back from the VPGN, these may be accumulated in the long term average, to allow the facility to observe the net amount of electricity supplied versus net amount accounted for by the VPGN, and thus verify contributions are being recognized.

Similar to how the FPGM 620 reports information to the grid provider, the FPGM, in one embodiment, may also communicate with the VPGN server 610 via the network interface 122 or through a manual collection process. The FPGM sends the ECC and the signature to the VPGN server 610. The VPGN server records and performs the accounting for all FGP contributions by examining the ECC and verifying it using the respective signature. If verified, the VPGN can respond to the FPGM with another signature of the ECC using a separate private/public key pair from the one used to securely communicate with the grid provider, in instances where public key cryptographic techniques are being utilized. Upon recognizing that the VPGN has processed an ECC, the FPGM may convey the pertinent information to the local electricity producing consumers. The consumers can use this information to verify that their contribution have been received and accounted. As the VPGN verifies each ECC received, it accumulates and records the contribution of each FGP so that in the subsequent payment cycle, each respective FGP may be appropriately compensated according to its contribution.

In one embodiment, the VPGN may also receive packets from the FPGMs corresponding to the electricity consumed by the local facilities subscribing to the VPGN power distribution and supply network. However, existing meters (facility power meters) operated using conventional methods can also be used to report back the power consumption by the local facilities. The power production and consumption data received from each local facility can be used to compute the amount billed to each local facility consumer in the event that more power is drawn than contributed by the respective local facility consumer, or compute the amount to be compensated to each local facility consumer in the event that more power is contributed by the facility than drawn from the grid.

Figure 7:
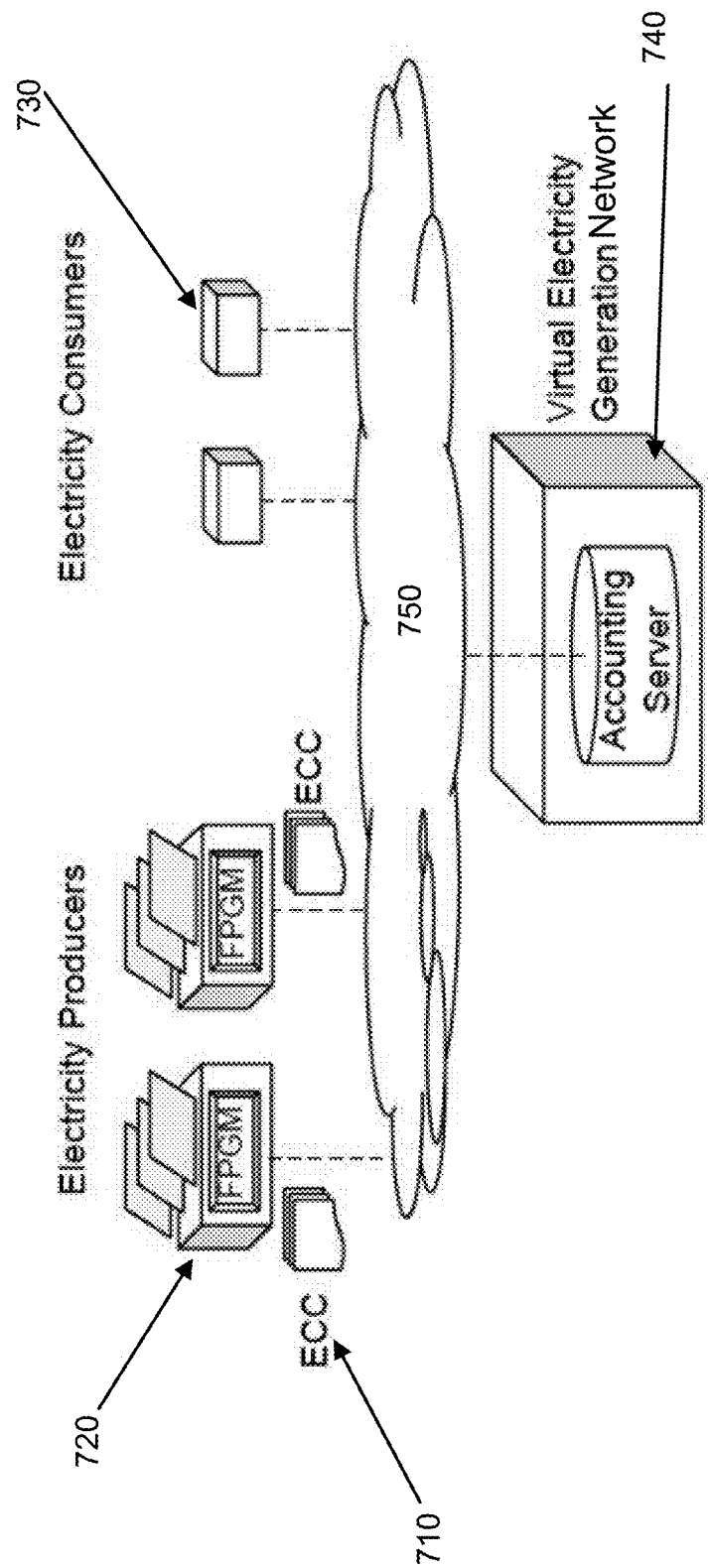
FIG. 7 is a high level block diagram illustrating the components of a virtual electricity generation and distribution system in accordance with one embodiment of the present invention.

FIG. 7 is a high level block diagram illustrating the components for a virtual electricity generation and distribution system (i.e., a VPGN) in accordance with one embodiment of the present invention. Each VPGN can be a conglomerate of distributed local electricity generation facilities. A VPGN, in one embodiment, may not only be a collection of power generating facilities 720, but also be available on a grid as a power provider, thereby, allowing electricity consumers 730 to also be part of the VPGN. When a VPGN is available on a grid as a power provider, other electricity consumers have an option to then purchase electricity from the VPGN. The power distribution and accounting system of the present invention allows all the contributions from the various distributed production facilities 720 to be accounted for in a cloud 750. Also, individual electricity consumers 730 can buy electricity for their personal use directly from the cloud 750. At the back-end, an accounting server 740, similar to servers 240 and 245 illustrated and discussed in FIG. 2, can keep track of the contribution and consumption levels of the various local facilities.

In one embodiment, producers 720 may be able to query the FPGM at their own local facility to verify their contribution or consumption history, and also query the accounting server 740 at the VPGN to determine whether their contributions are being fairly accounted for. For example, a producer 720 may be equipped with its own handheld collection device to collect data from the FPGM or the producer 720 may have some other manual means of doing a data dump from the FPGM. Alternatively, the FPGM could be connected through network interface 122 to the producer's personal computer allowing the consumer to interface with the FPGM through a Wi-Fi or web interface. One advantage of storing all the consumers' and producers' data in a cloud 750 is the ability for all the various entities that are part of a VPGN to be able to verify their respective contribution and consumption conveniently.

In one embodiment, the VPGN and the grid provider could also collaborate in order to, among other things, verify that all the contribution and consumption amounts have been accounted for fairly and accurately. If a VPGN and the grid provider are to share a grid, some type of collaboration between the two entities would be envisioned under the scheme proposed by the present invention. For example, a grid provider would need to audit the various compensation amounts to the local facilities so as to ensure that they are paying out accurate and fair amounts for the power contributed to the grid by the facilities and also being compensated for any net power being consumed by the facilities.

Further, collaboration between a VPGN and the grid provider, e.g., PG&E would facilitate compensation sharing between the various power provisioning entities. For example, in one embodiment, there could be an accounting for the percentage of power contributed by the grid provider to the facilities that constitute a particular VPGN network versus the percentage of power contributed by the facilities within the VPGN. In this way, the grid provider could be fairly compensated for the percentage of power contributed by it, while each of the facilities within the VPGN could be compensated for the amount of power contributed by the respective facility. In one embodiment, instead of splitting compensation on a percentage basis, each of the facilities, including the grid provider, could be compensated per kwh contributed to the grid.

In one embodiment, the grid provider may continue to charge the consumers directly for the net power consumed by them as determined from the auditing info received from the various FPGMs at the local facilities.

In another embodiment, the consumers could buy their power directly from the VPGN rather than the grid provider and VPGN could sub-contract with the grid provider to buy power during certain time periods. For example, where the facilities in a VPGN comprise FGPs that generate power predominantly through the use of solar panels, the VPGN could sub-contract with the grid provider to buy power during the night when solar panels are less efficient. The facilities within the VPGN could pay the VPGN for their usage based on the auditing information and the VPGN could compensate the grid provider directly on a lump sum basis. Because the grid provider also receives the ECCs from the various FPGMs, it could use that information to audit the amount paid to it by the VPGN. In a different embodiment, each net electricity consumer could receive two separate bills, one from the grid provider and one from the VPGN for power provided during different times of the day. In this embodiment, the consumer would handle their bill for power consumed from the grid provider and the VPGN separately.

In another embodiment, the entities that sell the consumers the FGPs, e.g., solar panels, could effectively become the consumer's power supply company. In this embodiment, instead of charging the consumer for the solar panel, the solar panel manufacturer would, in effect, be leasing the consumer's roof space and get compensated for generating power and contributing it to the grid. Meanwhile, the consumers could pay the solar panel manufacturer directly for any power it consumes.

Figure 8:
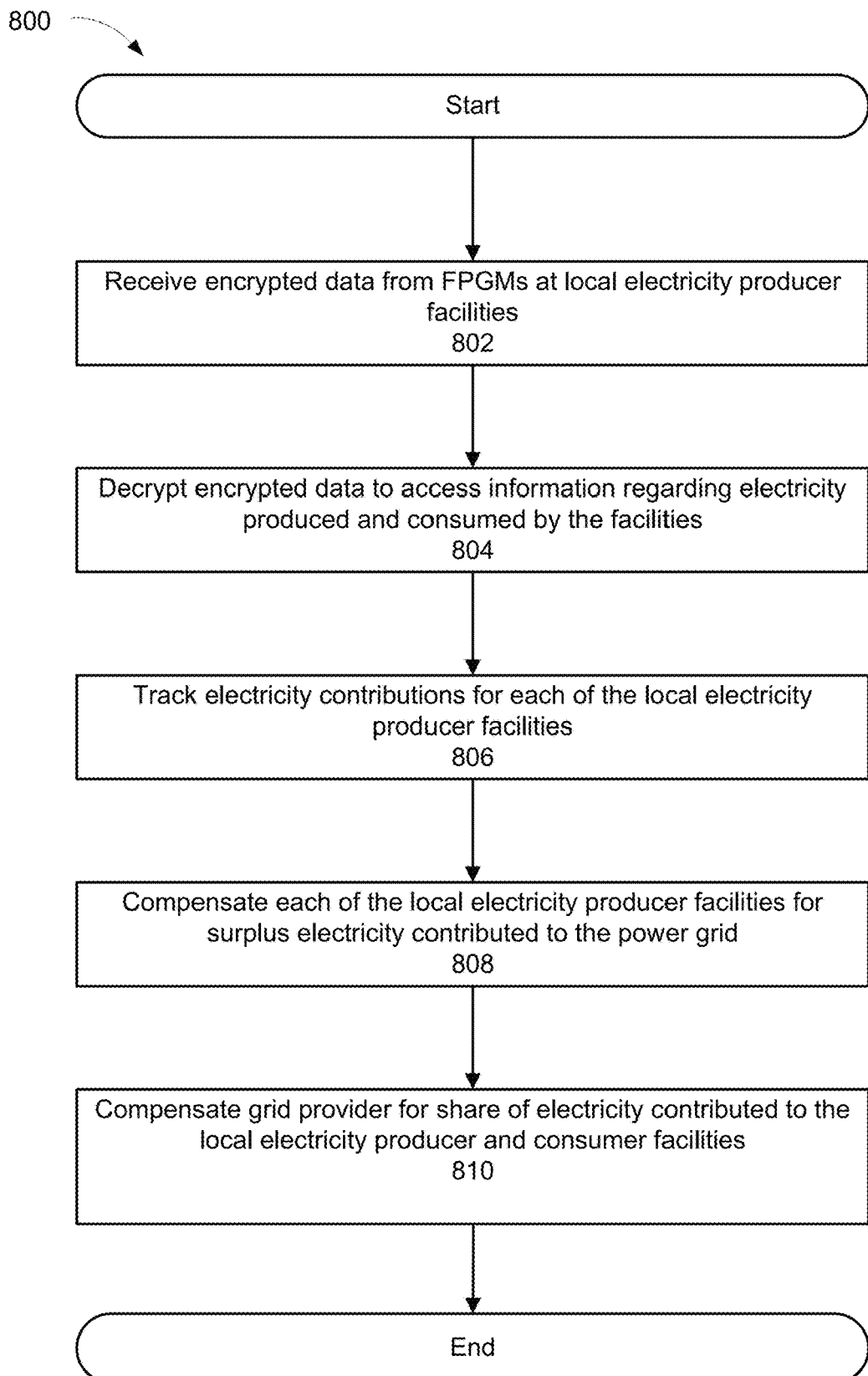
FIG. 8 depicts a flowchart 800 of an exemplary process of securely accounting for electricity contribution according to an embodiment of the present invention.

FIG. 8 depicts a flowchart 800 of an exemplary process of securely accounting for electricity contribution from local production facilities according to an embodiment of the present invention. The invention, however, is not limited to the description provided by flowchart 800. Rather, it will be apparent to persons skilled in the relevant art(s) from the teachings provided herein that other functional flows are within the scope and spirit of the present invention. Flowchart 800 will be described with continued reference to exemplary embodiments described above, though the method is not limited to those embodiments.

At step 802, the VPGN accounting server 740 receives information including cryptographic data from the FPGMs at the various local electricity producer facilities 720. As discussed above, the data, in one embodiment, can be transmitted in the form of ECC packets 710 and can be encrypted or signed using public key certificate techniques. In one embodiment, the data can be received by an accounting server controlled by the grid provider. In another embodiment, the server can also receive data from the electricity consuming facilities 730, in addition to the electricity producer facilities 720, regarding electricity consumed by the respective facilities.

At step 804, the data 710 is verified or decrypted to access information regarding electricity produced and consumed by the facilities. In one embodiment, the encrypted data only comprises information regarding electricity produced, while information regarding electricity consumed is conveyed by conventional means, e.g., using a regular meter (facility power meter).

At step 806, the data is used to track electricity contributions made by each of the local electricity producer facilities 720. In one embodiment, the data is also used to track electricity consumption by all the various facilities 720 and 730. In one embodiment, either the grid provider or the VPGN accounting server receiving the encrypted data could be running a tracking application that is operable to verify or decrypt the received data and keep track of the electricity contribution and consumption amounts for the various connected facilities.

At step 808, the various electricity producer facilities 720 are compensated for the surplus electricity each of them has contributed back to the grid. The servers at either the grid provider's or the VPGN's facilities are programmed to accurately, securely and robustly keep track of the contributions from the various facilities so that the integrity of the system can be relied upon.

In the embodiment where the VPGN keeps track of the various contributions, at step 810, the grid provider can be compensated for the portion of electricity contributed by the grid provider to facilities 720 and 730. For example, the grid provider may need to contribute electricity at overcast days when the solar panels installed at the producer facilities 720 are not as efficient. Therefore, while electricity provided by the producer facilities 720 may be prioritized within the VPGN network, the VPGN may still need to draw power from the grid provider on certain occasions and compensate the grid provider accordingly.

Figure 9:
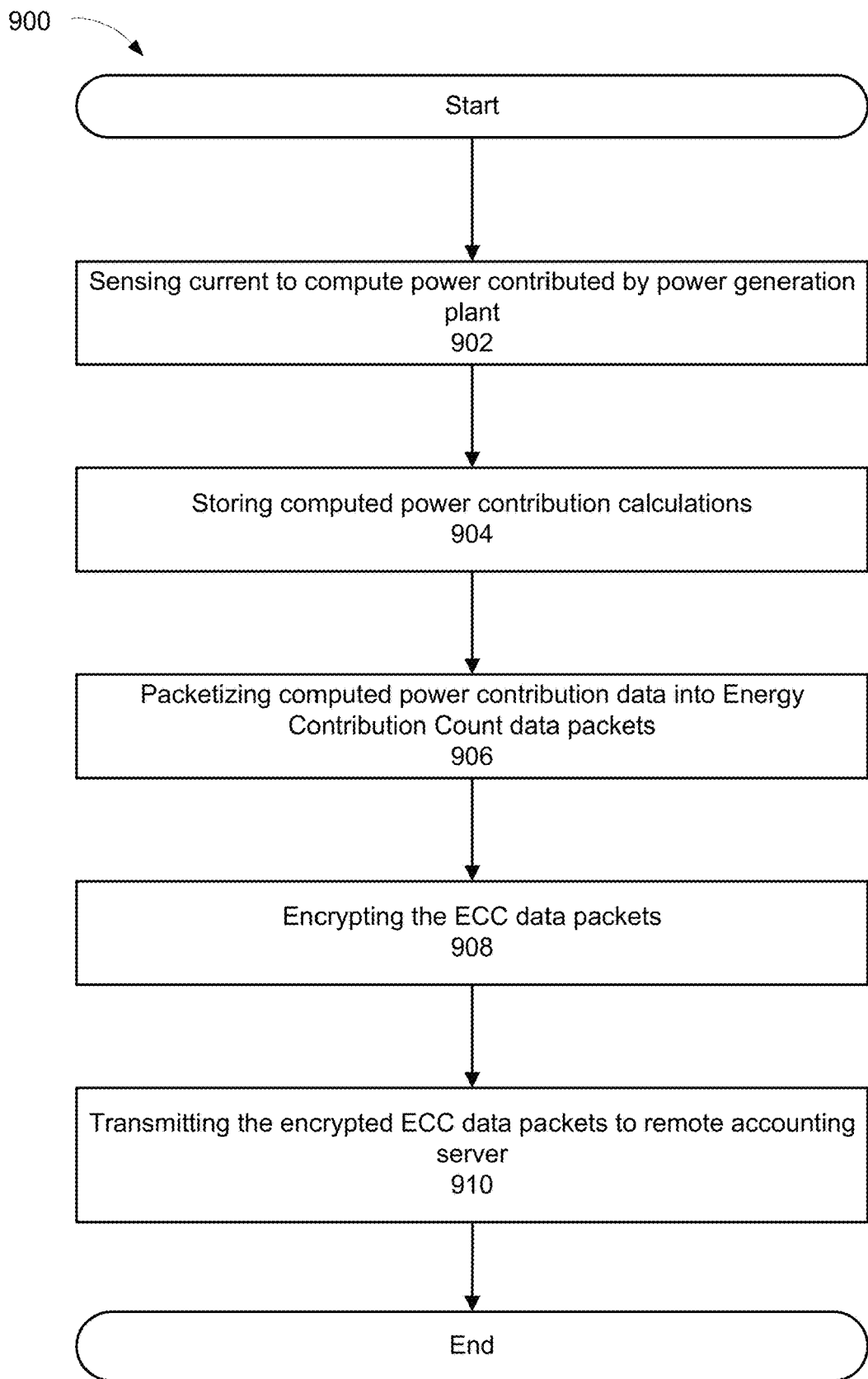
FIG. 9 depicts a flowchart 900 of an exemplary process of sensing electricity contributions and securely transmitting packets reporting electricity contribution to an accounting server according to an embodiment of the present invention.

FIG. 9 depicts a flowchart 900 of an exemplary process of sensing electricity contributions and securely transmitting packets reporting electricity contribution to an accounting server according to an embodiment of the present invention. The invention, however, is not limited to the description provided by flowchart 900. Rather, it will be apparent to persons skilled in the relevant art(s) from the teachings provided herein that other functional flows are within the scope and spirit of the present invention. Flowchart 900 will be described with continued reference to exemplary embodiments described above, though the method is not limited to those embodiments.

At step 902, a FPGM or "monitoring station" 620 installed at a facility 630 senses the outgoing current passing through the meter using current sense circuit 146 and computes the power that is contributed by the local FGP 650.

At step 904, the FPGM may store the computed power contributions in system memory 116 or a primary storage device 132.

At step 906, the FPGM packetizes the computed power contribution data into ECC data packets. The ECC data packets, as discussed above, comprise power contribution measured as an integral of power over time (watt-hours). They may also include a time-stamp and a unit of time over which the energy contribution was measured.

At step 908, the ECC data is encrypted using the encryption keys stored in the key storage module 148.

Finally, at step 910, the ECC data packets can be transmitted to remote accounting server 740.

Figure 10:
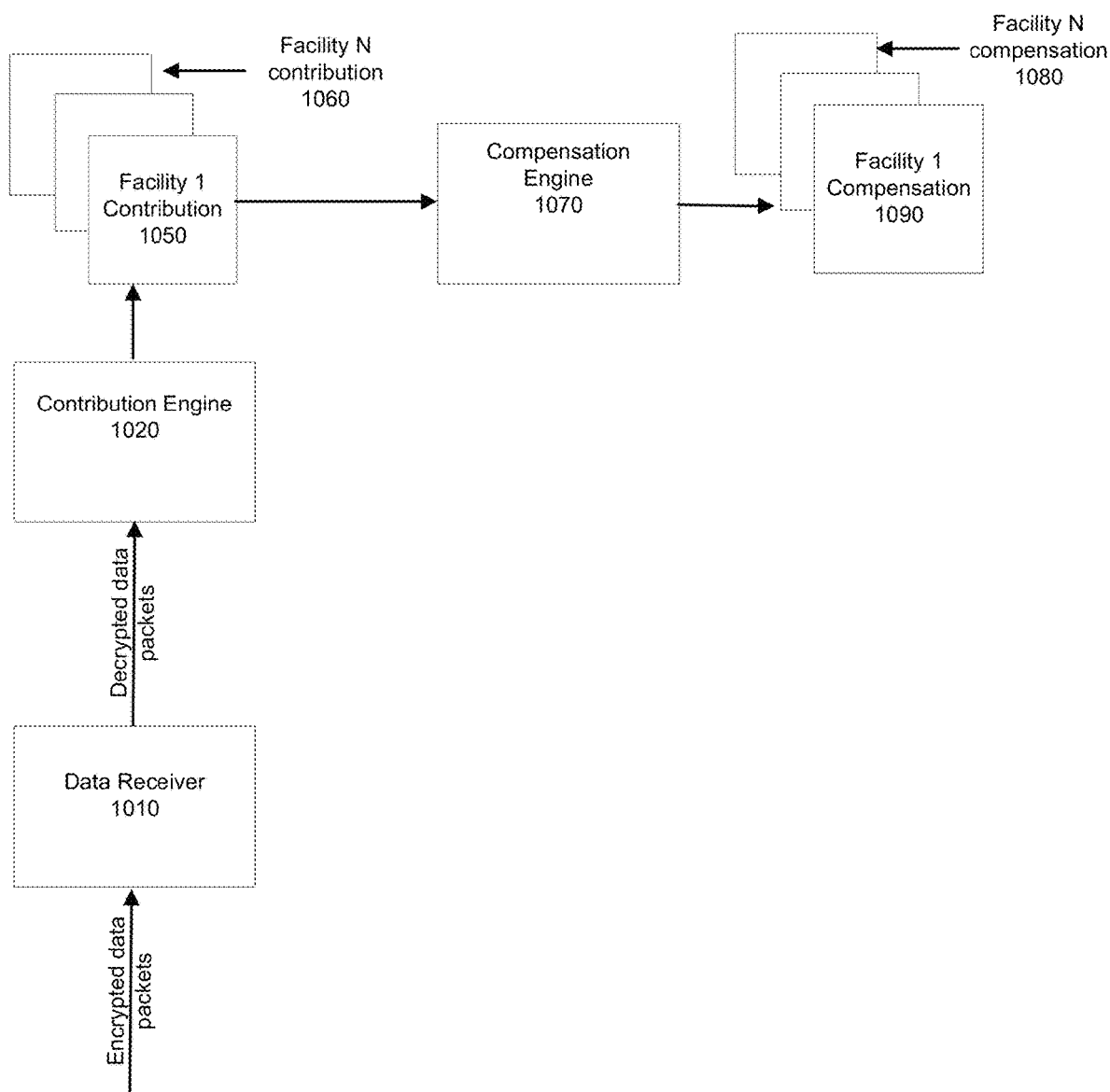
FIG. 10 is a block diagram illustrating the flow of data at an accounting server according to one embodiment of the present invention.

FIG. 10 is a block diagram illustrating the flow of data at an accounting server according to one embodiment of the present invention. The encrypted data packets are received by a data receiver 1010 at accounting server 740. The packets are decrypted by the receiver and forwarded to contribution engine 1020 for determining the contribution amounts from the decrypted data.

Contribution engine 1020 is operable to recognize contributions from the various monitoring stations at the connected power generating facilities 720 and keep track of the contribution from each of the facilities. For example, in FIG. 10, contribution engine 1020 keeps track of the contribution 1050 from Facility 1 separately from contribution 1060 from Facility N.

The respective contribution information is then passed to a compensation engine 1070. The compensation engine 1070 is responsible for converting the contribution amounts from each of the respective facilities to compensation amounts. For example, compensation engine 1070 will determine a separate compensation amount 1090 for Facility 1 based on the contribution amount 1050 for Facility 1. Further, it will determine a separate compensation amount 1080 for Facility N based on the contribution amount 1060 for Facility N.

Figure 11:
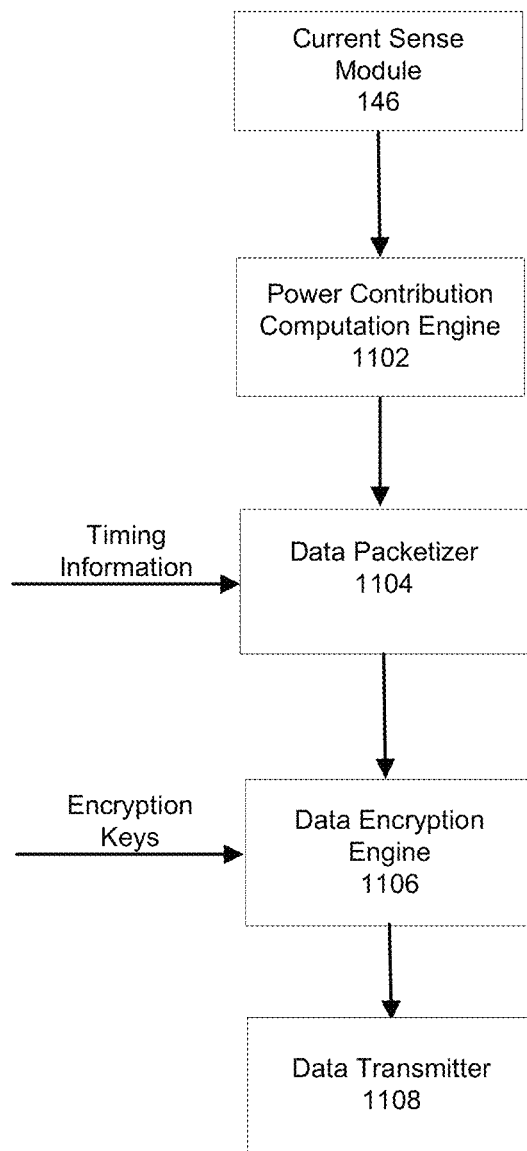
FIG. 11 is a block diagram illustrating the flow of data at a FPGM in accordance with one embodiment of the present invention.

FIG. 11 is a block diagram illustrating the flow of data at a FPGM in accordance with one embodiment of the present invention. As discussed in relation to FIG. 9, current sense module 146 determines the amount of outgoing electricity at a FPGM 620. The data collected by current sense module 146 is used by the power contribution computation engine 1102 to determine the amount of power contributed back into the grid from FGP 650. The data packetizer 1104 transforms the power contribution data from power contribution computation engine 1102 into ECC packets 710. Data packetizer 1104 also receives timing information, wherein the timing information is used to time-stamp the ECC data packets.

The ECC data packets 710 are encrypted using data encryption engine 1106. Data encryption engine 1106 may receive encryption, certificates and signing keys from keys storage module 148. The encrypted or signed data is subsequently transmitted to an accounting server using data transmitter module 1108.

According to some embodiments, a virtual power supply company may enter into agreement with power grid provider for their collective use of a shared power grid, to supply power to consumers through the power grid, as well as, to draw power from the power grid. The agreements may provide for fair accounting of aggregate contribution onto the shared power grid, or consumption from the grid, by the co-operative facilities, using information collected from facilities, and with a mutually agreed format and authentication systems, to support cross auditing of the contributions and consumption.

According to some embodiments, cryptographic processes are performed on encrypted and signed information in order to attest to the authenticity of the facility information, and verify the attribution to a specific facility. Cryptographic processes can be performed to extract the encrypted information, and verify the signatures concerning electricity contributions and consumptions. Respective electricity contributions from each of the first plurality of facilities can be tracked using the cryptographic attestation and attribution verification processes.

According to some embodiments, the facility electricity metering system involves securely embedding cryptographic material, including keys, certificates authenticating said keys, cryptographic processes, challenge-response protocols, and information signing processes within metering equipment of said facilities.

According to some embodiments, the facility metering equipment includes cryptographic material such as a signing keys, and certificates, provided by the grid supplier and/or auditor of said contribution and consumption information, for the purpose of signing said information within the facility metering equipment, in a manner that permits cryptographically attesting to the use of approved facility metering equipment, and the independent verification of the authenticity of said metering information.

According to some embodiments, electricity consumption by each of said first plurality of facilities is accounted for using metering information and the information is validated using cryptographic processes to authenticate the information and attribute the information to a specific facility.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method comprising:
providing a facility power meter at a facility, wherein the facility power meter counts a power consumed by the facility from a power grid;
providing a facility power generation meter at the facility that draws power from the power grid daring at least one of first time periods for the facility, and supplies power to the power grid during at least one of second time periods from an onsite and local power generation capability of the facility, wherein the facility power generation meter includes a network interface operable to allow communication with a power grid provider;
providing a current sense circuit and a processor to the facility power generation meter;

creating at least one physical connection between the facility power generation meter and a facility-local power subnetwork that is connected to the facility and to the power grid;

creating at least one physical connection between the facility-local power subnetwork and an inverter of the onsite and local power generation capability, wherein the inverter is connected to the facility power generation meter;

receiving by the facility power generation meter a current from the facility-local power subnetwork through the at least one physical connection between the facility power generation meter and the facility-local power subnetwork, wherein the current is indicative of power relative to the power grid and the facility;

generating by the current sense circuit of the facility power generation meter a sensed current value for the processor of the facility power generation meter from the current received from the facility-local power subnetwork through the at least one physical connection between the facility power generation meter and the facility-local power subnetwork;

in a first occasion, locally using the processor of the facility power generation meter at the facility to handle the sensed current value to determine how much power the facility drew from the power grid and how much power the facility supplied to the power grid, and to count a first net amount of power supplied by the facility to the power grid during a particular time interval;

in a second occasion, locally using the processor of the facility power generation meter at the facility to handle the sensed current value to determine an amount of power supplied by the facility to the power grid;

in the second occasion, locally using a count by the facility power meter of the power consumed by the facility from the power grid and the determined amount of power supplied by the facility to the power grid to count a second net amount of power supplied by the facility to the power grid during a different time interval; and wirelessly exchanging a serial number of a handheld collection device, a last timestamp collected, and a number of time intervals collected as a confirmation between the handheld collection device and the facility power generation meter after the handheld collection device completes a wireless collection from the facility power generation meter of a plurality of net amounts of power supplied by the facility to the power grid during a plurality of time intervals.

2. The method of claim 1, further comprising:
subscribing the facility to a virtual power collective, wherein operation of the facility power generation meter is preconfigured according to a collective standard established by the virtual power collective to mitigate falsification and under-accounting of information that represents the plurality of net amounts of power, wherein the network interface is configured to allow communication with the virtual power collective.

3. The method of claim 2, wherein the facility power generation meter further comprises a memory and cryptographic keys and cryptographic certificate material stored securely in the memory.

4. The method of claim 3, further comprising:
using the processor to secure the information that represents the plurality of net amounts of power with at least one cryptographic certificate signing process prescribed by the virtual power collective according to the collective standard.

5. The method of claim 3, further comprising:
using the processor to perform on the information that represents the plurality of net amounts of power at least one cryptographic process prescribed by the virtual power collective according to the collective standard.

6. The method of claim 2, wherein the collective standard comprises at least one of certificates, public keys, private keys, keying materials, cryptographic encryption processes, or cryptographic certificate signing processes, which is provided by the virtual power collective and is required for the facility to participate in the virtual power collective.

7. The method of claim 1, wherein the onsite and local power generation capability comprises at least one of wind, solar, geothermal, blume, fuel-cell, or power storage resources.

8. A method comprising:
providing a facility power meter at a facility, wherein the facility power meter counts a power consumed by the facility from a power grid;

drawing power for the facility from the power grid during at least one of first time periods;

supplying power to the power grid during at least one of second time periods from an onsite and local power generation capability of the facility; and providing a facility power generation meter at the facility, wherein said providing includes:
providing a current sense circuit and a processor to the facility power generation meter, creating at least one physical connection between the facility power generation meter and a facility-local power subnetwork that is connected to the facility and to the power grid, creating at least one physical connection between the facility-local power subnetwork and an inverter of the onsite and local power generation capability, wherein the inverter is connected to the facility power generation meter, receiving and sensing a current from the facility-local power subnetwork by the current sense circuit of the facility power generation meter through the at least one physical connection between the facility power generation meter and the facility-local power subnetwork, wherein the current is indicative of power relative to the power grid and the facility, wherein the facility power generation meter comprises a network interface operable to allow communication with a power grid provider, generating by the current sense circuit of the facility power generation meter a sensed current value for the processor of the facility power generation meter from the current received from the facility-local power subnetwork through the at least one physical connection between the facility power generation meter and the facility-local power subnetwork, in a first occasion, locally using the processor of the facility power generation meter at the facility to handle the sensed current value to determine how much power the facility drew from the power grid and how much power the facility supplied to the power grid, and to count a first net amount of power supplied by the facility to the power grid during a particular time interval, in a second occasion, locally using the processor of the facility power generation meter at the facility to handle the sensed current value to determine an amount of power supplied by the facility to the power grid, in the second occasion, locally using a count by the facility power meter of the power consumed by the facility from the power grid and the determined amount of power supplied by the facility to the power grid to count a second net amount of power supplied by the facility to the power grid during a different time interval, and wirelessly exchanging a serial number of a handheld collection device, a last timestamp collected, and a number of time intervals collected as a confirmation between the handheld collection device and the facility power generation meter after the handheld collection device completes a wireless collection from the facility power generation meter of a plurality of net amounts of power supplied by the facility to the power grid during a plurality of time intervals.

9. The method of claim 8, further comprising:
subscribing the facility to a virtual power collective, wherein operation of the facility power generation meter is preconfigured according to a collective standard established by the virtual power collective to mitigate falsification and under-accounting of information that represents the plurality of net amounts of power, wherein the network interface is configured to allow communication with the virtual power collective.

10. The method of claim 9, wherein the facility power generation meter further comprises a memory and cryptographic keys and cryptographic certificate material stored securely in the memory.

11. The method of claim 10, further comprising:
using the processor to secure the information that represents the plurality of net amounts of power with at least one cryptographic certificate signing process prescribed by the virtual power collective according to the collective standard.

12. The method of claim 10, further comprising:
using the processor to perform on the information that represents the plurality of net amounts of power at least one cryptographic process prescribed by the virtual power collective according to the collective standard.

13. The method of claim 9, wherein the collective standard comprises at least one of certificates, public keys, private keys, keying materials, cryptographic encryption processes, or cryptographic certificate signing processes, which is provided by the virtual power collective and is required for the facility to participate in the virtual power collective.

14. The method of claim 8, wherein the onsite and local power generation capability comprises at least one of wind, solar, geothermal, blume, fuel-cell, or power storage resources.

15. A method comprising:
operating a virtual power collective configured to communicate with a plurality of subscribed facilities;

receiving first information that represents a first net amount of power supplied by a first subscribed facility to a power grid during a first particular time period, wherein the first net amount of power is locally calculated at the first subscribed facility;

receiving second information that represents a second net amount of power supplied by a second subscribed facility to the power grid during a second particular time period, wherein the second net amount of power is locally calculated at the second subscribed facility; and validating the first and second information and performing accounting tasks to compensate the first and second subscribed facilities, respectively, based at least on the first and second information, respectively, wherein each subscribed facility includes a respective facility power meter at a respective subscribed facility operable to count a respective power consumed by the respective subscribed facility from the power grid, a respective onsite and local power generation capability, a respective facility-local power subnetwork, a respective inverter, and a respective facility power generation meter operable to use a respective current sense circuit to sense a respective current from the respective facility-local power subnetwork to generate a respective sensed current value for a respective processor of the respective facility power generation meter from the respective current received through respective at least one physical connection between the respective facility power generation meter and the respective facility-local power subnetwork, wherein the respective current is indicative of power relative to the power grid and the respective subscribed facility, wherein respective at least one physical connection exists between the respective facility-local power subnetwork and the respective inverter, wherein the respective inverter is connected to the respective facility power generation meter, wherein in a first occasion, the respective processor of the respective facility power generation meter is locally used at the respective subscribed facility to handle the respective sensed current value to determine how much power the respective subscribed facility drew from the power grid and how much power the respective subscribed facility supplied to the power grid, and to count a first particular net amount of power supplied by the respective subscribed facility to the power grid during a particular time interval, wherein in a second occasion, the respective processor of the respective facility power generation meter is locally used at the respective subscribed facility to handle the respective sensed current value to determine a respective amount of power supplied by the respective subscribed facility to the power grid;

wherein in the second occasion, a respective count by the respective facility power meter of the respective power consumed by the respective subscribed facility from the power grid and the determined respective amount of power supplied by the respective subscribed facility to the power grid are locally used to count a second particular net amount of power supplied by the respective subscribed facility to the power grid during a different time interval, wherein a serial number of a respective handheld collection device, a respective last timestamp collected, and a respective number of time intervals collected are wirelessly exchanged as a confirmation between the respective handheld collection device and the respective facility power generation meter after the respective handheld collection device completes a wireless collection from the respective facility power generation meter of a respective plurality of net amounts of power supplied by the respective subscribed facility to the power grid during a plurality of time intervals, wherein the respective facility power generation meter includes a respective network interface operable to allow communication with the virtual power collective and with a power grid provider.

16. The method of claim 15, wherein operation of the respective facility power generation meter is preconfigured according to a collective standard established by the virtual power collective to mitigate falsification and under-accounting of respective information that represents the respective plurality of net amounts of power, and wherein the respective onsite and local power generation capability comprises at least one of wind, solar, geothermal, blume, fuel-cell, or power storage resources.

17. The method of claim 16, wherein the respective facility power generation meter further comprises a respective memory and respective cryptographic keys and cryptographic certificate material stored securely in the respective memory.

18. The method of claim 17, further comprising:
using the respective processor to secure the respective information that represents the respective plurality of net amounts of power with at least one cryptographic certificate signing process prescribed by the virtual power collective according to the collective standard.

19. The method of claim 17, further comprising:
using the respective processor to perform on the respective information that represents the respective plurality of net amounts of power at least one cryptographic process prescribed by the virtual power collective according to the collective standard.

20. The method of claim 16, wherein the collective standard comprises at least one of certificates, public keys, private keys, keying materials, cryptographic encryption processes, or cryptographic certificate signing processes, which is provided by the virtual power collective and is required for the respective subscribed facility to participate in the virtual power collective.

* * * * *